(12) United States Patent  (10) Patent No.: US 7,789,445 B2
Hoffman et al.  (45) Date of Patent: Sep. 7, 2010

(54) NET PET BARRIER

(75) Inventors: Patrick Hoffman, Arlington, TX (US); David King, Allen, TX (US); Thomas B. Murphy, Arlington, TX (US)

(73) Assignee: Solvit Products, LP, Mansfield, TX (US)

( * ) Notice: Subject to any disclaimer, the term of this patent is extended or adjusted under 35 U.S.C. 154(b) by 216 days.

(21) Appl. No.: 11/833,711

(22) Filed: Aug. 3, 2007

(65) Prior Publication Data

US 2008/0136205 A1 Jun. 12, 2008

Related U.S. Application Data

(60) Provisional application No. 60/835,316, filed on Aug. 3, 2006.

(51) Int. Cl.
*B60J 7/00* (2006.01)
(52) U.S. Cl. .................. 296/24.31; 296/24.43

(58) Field of Classification Search ............ 296/24.43, 296/24.46, 24.31
See application file for complete search history.

(56) References Cited

U.S. PATENT DOCUMENTS

| 5,005,526 A | 4/1991 | Parker |
| 5,123,377 A | 6/1992 | Edwards |
| 5,479,892 A | 1/1996 | Edwards |
| 5,785,003 A | 7/1998 | Jacobson |

*Primary Examiner*—Joseph D Pape
(74) *Attorney, Agent, or Firm*—Booth Albanesi Schroeder, LLC; Peter V. Schroeder

(57) ABSTRACT

A net pet barrier designed for installation behind the front or rear seat in a vehicle to keep pets off vehicle seats and in the back of the vehicle. Netting formed of micro-mesh material is attached to a pop-up wire frame which keeps the net from sagging and facilitates installation and removal. Adjustable side expansion panels allow installation of the barrier in vehicles of various sizes and configurations, from sedans to full-size SUVs.

8 Claims, 3 Drawing Sheets

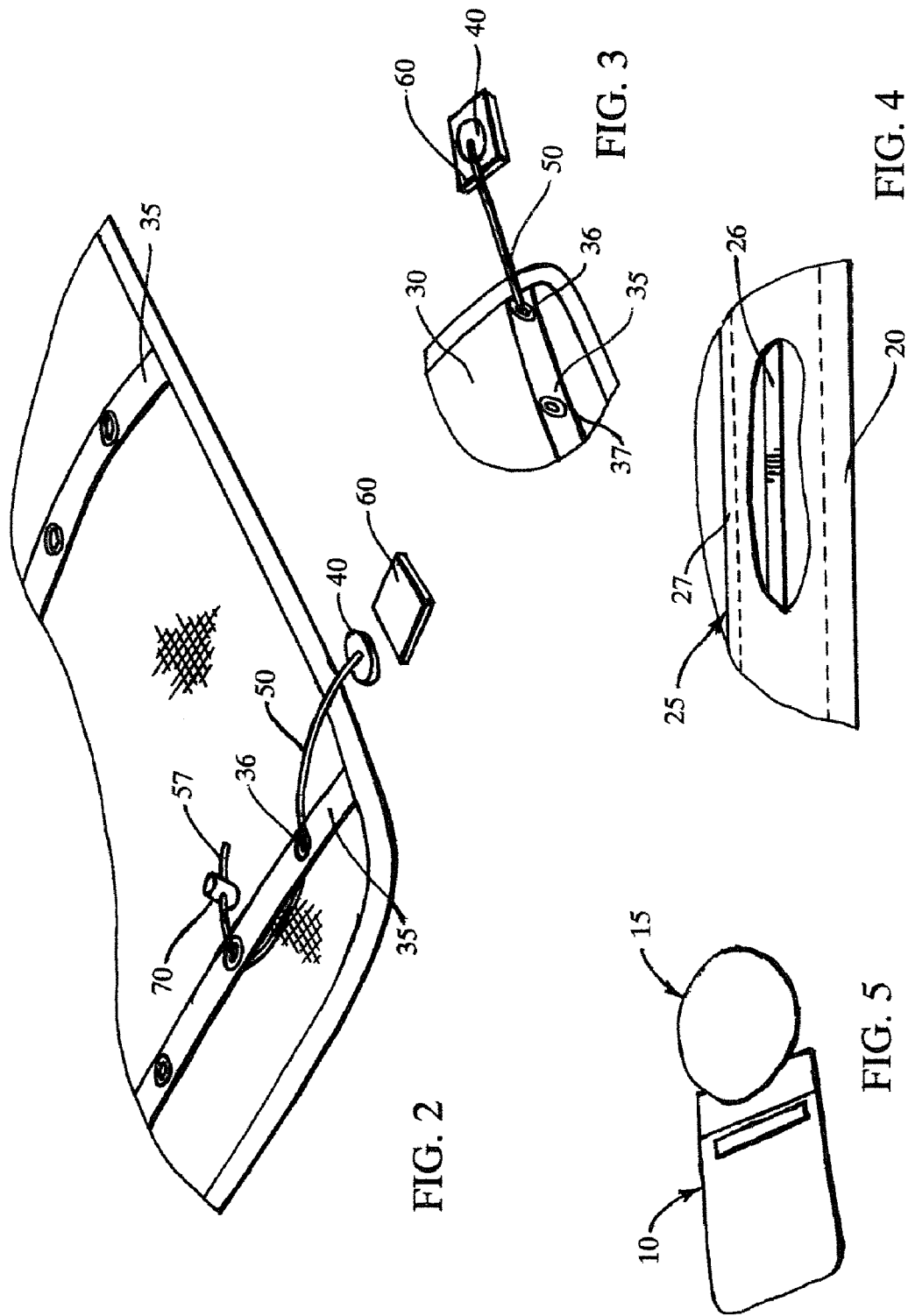

NET PET BARRIER

CROSS-REFERENCE TO RELATED APPLICATIONS

Applicant claims priority of U.S. Provisional Application Ser. No. 60/835,316, filed Aug. 3, 2006.

STATEMENT REGARDING FEDERALLY SPONSORED RESEARCH OR DEVELOPMENT

Not applicable

REFERENCE TO MICROFICHE APPENDIX

Not applicable

TECHNICAL FIELD

A Net Pet Barrier designed for installation behind the front or rear seat in a vehicle to keep pets off vehicle seats and in the back of the vehicle.

BACKGROUND OF INVENTION

Excited pets can be very distracting to the driver and can be especially dangerous if the pet interferes with access to the vehicle pedals or interferes with steering the vehicle. Pet restraining devices have been devised to control pets while being transported in vehicles. One is a harness that is useful on larger animals and the other is a basket-like carrier for smaller animals. Bird dogs used for hunting are often loaded in a portable kennel or cage.

DESCRIPTION OF THE PRIOR ART

Vehicle pet barriers exist that are assemblies of metal tubing that have "compression rods" that fit between the floorboard and headliner of a vehicle. Problems with these types of barriers are: high cost, heavy weight, large packaged size, difficulty of installation, and difficulty of uninstallation.

Barriers also exist that are sections of netting with fasteners on the edges which attach to mating fasteners on a vehicle's interior. While these types of barriers are cheaper to manufacture, are lighter in weight and have smaller package size, there are some problems including: tendency to sag when installed; difficult to adjust to various size vehicles, thus requiring a multitude of sizes to fit all vehicles; difficult to return to its originally-packed size and configuration when uninstalled; the use of a fairly large netting material with large (1+-inch) hole size creates a large "pattern" which is distracting to drivers trying to see through it when it is installed.

SUMMARY OF THE INVENTION

The net pet barrier we have devised comprises netting material fastened to a metal wire hoop, that pops open and folds down in three concentric circles. By fastening to this wire hoop, the netting is stretched tight when opened and will not sag. Also, when the wire frame is "closed", the netting returns to its original packaged shape to stow easily in its included pouch.

To allow the barrier to adjust to fit multiple vehicles, an "expansion panel" is included on the left and right sides of the barrier, outside the wire framed section. This expansion panel has a set of "grommet strips" running laterally from the outer edge of the netting.

DESCRIPTION OF THE DRAWINGS

Drawings of a preferred embodiment of the invention are annexed hereto, so that the invention may be better and more fully understood, in which:

FIG. 2 is a fragmentary elevational view of an expansion panel with grommet strips attached;

FIG. 3 is a perspective view illustrating a fastener set for securing the barrier in a vehicle;

FIG. 4 is an enlarged fragmentary elevational view of the wire frame, parts being broken away to show details of construction;

FIG. 5 is an elevational view of a pouch; and

Numeral references are employed to designate like parts throughout the various figures of the drawing.

DESCRIPTION OF PREFERRED EMBODIMENT

Figure 1:
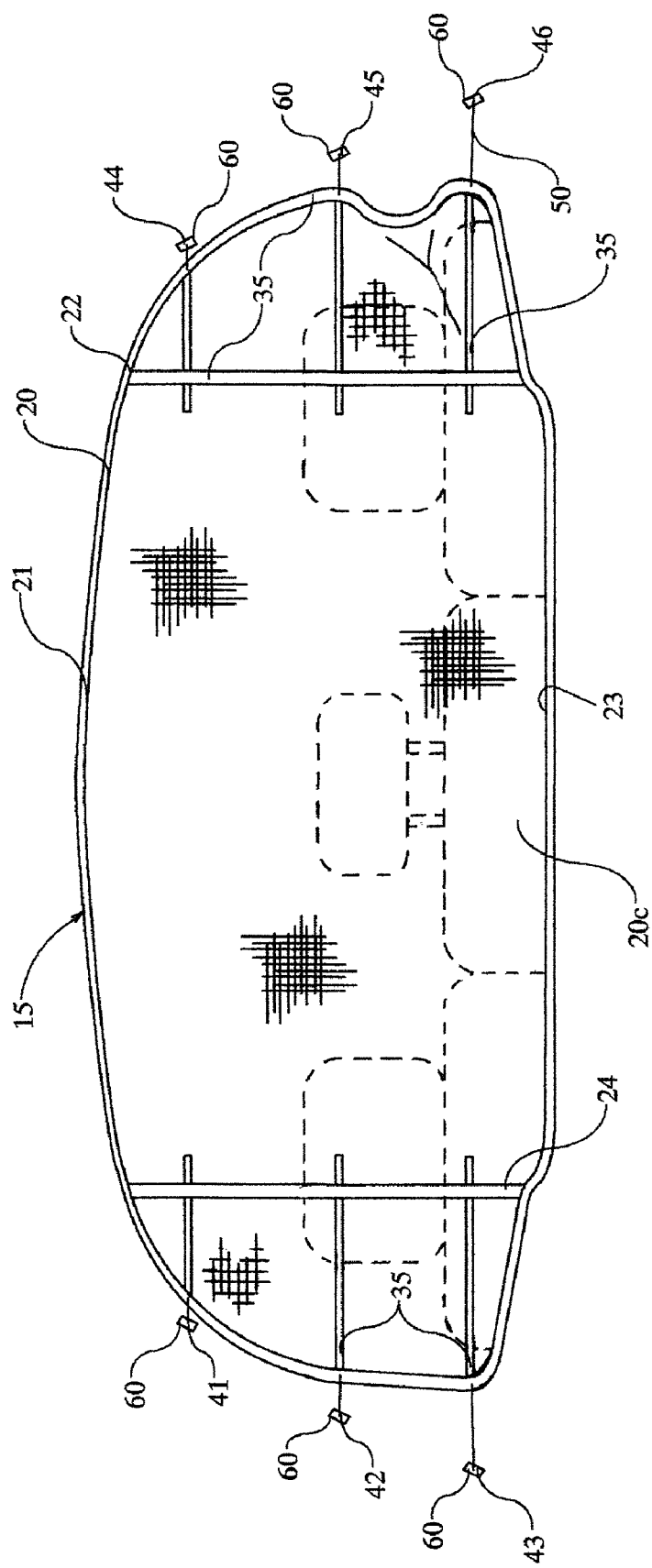
FIG. 1 is a perspective view illustrating a net pet barrier installed behind the back seat in a SUV.
Figure 6:
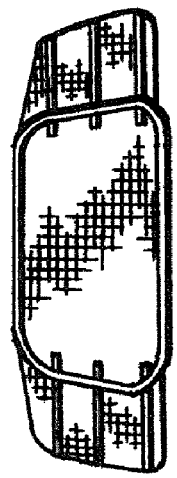
FIGS. 6-11 illustrate the barrier being folded for storage.
Figure 7:
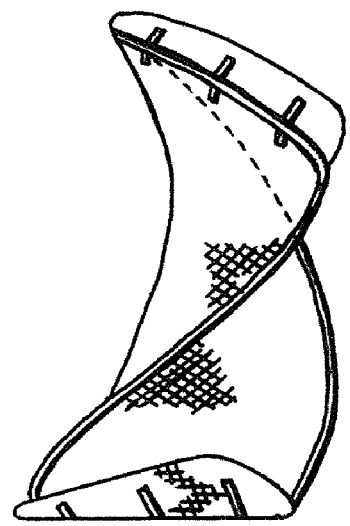
Figure 8:
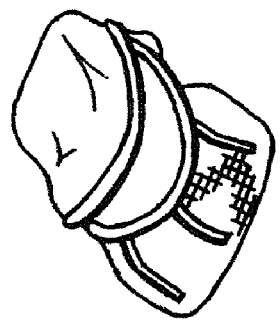
Figure 9:
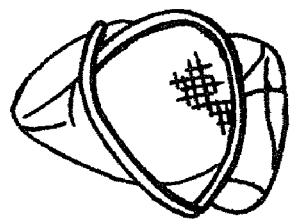
Figure 10:
Figure 11:
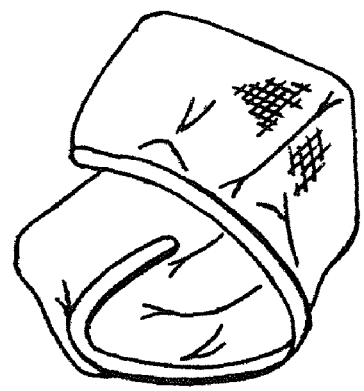

A preferred embodiment of the barrier comprises a storage pouch 10 containing a pet barrier 15 including a large netting section 20, and a kit of fastener sets 40 each of which includes six circular fasteners 41-46 with cords 50 attached, six square fasteners 60 with adhesive backing, and six spring-loaded barrel locks 70. It should be noted that only six of the fastener sets are needed to install the barrier 15. Spare fastener sets may be stored in the storage pouch 10 or some other safe place.

As illustrated in FIG. 1, the large netting section 20 has a generally rectangular central section 20C bounded by a wire frame 25 comprising a casing 27 which encloses a wire 26, as best illustrated in Fig. _ of the drawings. Casing 27, extending around top, right, bottom and left edges 21, 22, 23 and 24 of central section 20C, is formed by a folded strip of material to form an envelope of sorts for encasing a wire 26, as will be hereinafter more fully explained. The folded strip is preferably sewn or can be welded around the periphery of the central section 20C of netting section 20.

Side expansion panels 30 are secured to the wire frame 25 extending along the right edge 22 and left edge 24 of central section 20C. A plurality of grommet strips 35, each having horizontally spaced grommets 36 having holes 37 formed therein, are vertically spaced and extend generally horizontally across the right and left side panels 30. A strip of edging, similar to casing 27, extends around edges of side expansion panels 30.

Cords 50 preferably are provided with shoestring tips 51 on one outer end thereof, which can be of conventional plastic or metal design, can be attached to one end of the cordage. The opposite end of each cord 50 extends through an aperture formed in a circular fastener disk 40 or button. A disk of adhesive-backed reclosable flexible fastener material is bonded to the face of each circular disk 40. Each of the square fasteners 60 has an adhesive backing connectable to the vehicle's interior.

Reclosable adhesive-backed flexible fasteners consisting of continuous plastic strips with fields of mushroom-shaped plastic heads which tightly interlock when pressed together are commercially available under the registered trademark "Dual-Lock" from Minnesota Mining and Manufacturing Company, aka 3M, of Saint Paul, Minn. It should be appreciated that hook and loop fastener material may be used, such as material commercially available under the trademark "VELCRO" from Velcro Industries B.V. of Curacao, Netherlands.

Barrel locks 70 have a body containing a plunger which can be pressed inwardly relative to the body against the resistance of an actuating spring, with the body and plunger having apertures through which a cord 50 or cords can extend and which have edges acting to grip the cords when the plunger is in a predetermined locking position. The apertures are desirably of oblong sectional shape, and the gripping edges of the plunger and body are preferably sharpened in a relation assuring effective clamping of the cord 50.

Barrier 15 is designed for installation behind the front or rear seat in all vehicles. The netting section 20 is attached to a wire frame 25 which "pops open" automatically. Care should be taken when removing the netting section 20 from the storage pouch 10.

In general, installation of barrier 15 consists of three steps:

1) Adhere six of the square fasteners 60 with adhesive backing to the vehicle's interior;

2) Attach six of the round fasteners 40 with cord 50, extending through holes 37 in grommets 36 on grommet strips 35, to the netting section 20; and 3) Suspend netting section 20 by connecting the round fasteners 40 to the square fasteners 60.

The following instructions provide detail for each of the above steps.

Step 1: The square fasteners 60 must be attached to the plastic covers on the vertical columns which separate the windows—three fasteners per side—either behind the front seat or behind the back seat.

It is critical that the square fasteners 60 be attached to a super-clean surface.

The approximate position to adhere the three square pieces 60 is: 1) at the highest point on the plastic cover, or about 5 inches below the headliner, whichever is lower; 2) eight inches below the first fastener 60; and 3) eight inches below the second fastener 60. Vehicle dimensions vary widely; therefore, to determine the exact position to adhere the fasteners 60, we recommend holding the netting section 20 in place by hand, centered in the vehicle and behind the seat, with the top of the wire frame 25 flush with the headliner. Now stretch the side panels 30 of the netting section out until they reach the plastic covers (this is easier with two people). Please note the netting section is large enough to fit the widest vehicles. Therefore, the side panels 30 might not extend fully before touching the plastic covers—this is normal for most vehicles! Make sure the side panels 30 are held such that the grommet strips 35 are in a level position. Starting on one side of the vehicle, mark with a pencil the location where each of the three grommet strips 35 touches the plastic cover. Add three marks on the other side of the vehicle that are "mirror images" of the first three marks (same height, same forward position).

Around each of the six pencil marks, clean a 2-inch square area thoroughly with rubbing alcohol. Repeat this cleaning step three times to make sure the surface is ready. Working one at a time, peel the backing off the fasteners 60 and press firmly against the plastic where it has been cleaned. Once all six fasteners 60 are in place, wait overnight before installing the netting section 20. Store the extra square fastener 60 in a safe place.

Step 2 (next day): To attach the six round fasteners 40 to the netting section, thread the cord 50 from each fastener through the outermost grommet hole 37 on each of the six grommet strips 35, and slip a spring-loaded barrel lock 70 onto each cord 50. Store the extra round fastener and barrel lock 70 in a safe place.

Step 3: Hold the netting section in place in the vehicle so the two pieces of "hook" tape 75 along the bottom of the wire frame 25 are facing toward the front. Press each of the round fasteners 40 against its respective square fastener 60 until all six fastener sets are connected.

Most likely, it will be necessary to adjust the location of the barrel locks 70 on the fastener cords 50 to achieve the best fit. On narrower vehicles, the cords 50 might need to be threaded through two or more grommets 36 to get the best fit. In this case, the netting on the side panels 30 will gather in a fan-fold pattern when the barrel locks 70 are tightened. This keeps the material neat and out of the driver's vision. If necessary, excess cord 50 can be kept out of the way by tying it in a loose knot or bow.

The hook tape strips 28 along the bottom of the wire frame 25 will adhere to most automotive carpet. Press the strips into the carpet on the back of the seats (if applicable) to further stabilize the barrier 15.

Once adjusted for the correct fit, the net pet barrier 15 can be uninstalled and reinstalled quickly and easily. To uninstall, carefully pull each of the round fasteners 40 off the square fasteners 60, grab the short sides 22 and 24 of the Wire frame 25 with both hands, and twist (one hand clockwise, the other counter-clockwise) so the wire frame 25 will "fold" into three loops which align together. Slip the net 20 in this position into the provided pouch 10 for storage. To reinstall, carefully remove the "folded" net 20 from the pouch 10 taking care the wire frame 25 does not "pop open" unintentionally. Reposition the netting section 20 in the vehicle, press the round and square fasteners 60 together and adjust the barrel locks 70, if necessary.

Terms such as "horizontal," "vertical," "up," and "down" When used in reference to the drawings, generally refer to the orientation of the parts in the illustrated embodiment and not necessarily in the described orientation during use.

While preferred embodiments of the method and apparatus for forming a pet booster seat have been disclosed, it should be apparent that other and further embodiments may be devised without departing from the basic concepts of the invention.

It is to be understood, that, while detailed descriptions of a preferred embodiment have been illustrated and described, the invention is not to be limited to the specific arrangement of parts and specific features herein described and illustrated in the drawing. Rather, the descriptions are merely of an exemplary embodiment of the invention, which may be embodied in various forms.

The invention claimed is:

1. A net pet barrier configured for installation in a motor vehicle comprising:

netting formed of micro-mesh material;

a pop-up wire frame around said netting, including a central section, to keep the net from sagging;

adjustable side expansion panels secured to said wire frame extending along the right edge and left edge of said central section to allow installation of the barrier in vehicles of various sizes and configurations;

a plurality of grommet strips, each of said strips having horizontally spaced grommets having holes formed therein, vertically spaced and extending generally horizontally across the right and left side expansion panels;

cords extending through said grommets and through an aperture formed in a circular fastener disk having adhesive-backed reclosable flexible fastener material bonded to the face thereof;

a plurality of square fasteners having adhesive backing connectable to the vehicle's interior and releasably connectable to said circular fastener disks; and barrel fasteners securing said cords in said grommets for adjusting said barrier relative to the vehicle, such that pet movement from one side of the barrier to the other side of the barrier is prevented.

2. A net pet barrier configured for installation in a motor vehicle comprising:
a pop-up wire frame;
a net suspended on said pop-up frame to keep the net from sagging;
a plurality of fasteners for releasably connecting the barrier to a plurality of cooperating fasteners connectable to the interior of the vehicle, such that when the plurality of fasteners are connected to the plurality of cooperating fasteners, the barrier extends laterally across the interior of the vehicle and pet movement from one side of the barrier to the other is prevented.

3. A barrier according to claim 2, wherein the net is formed of micro-mesh material.

4. A barrier according to claim 2, wherein adjustable side expansion panels are secured to the pop-up wire frame to allow installation of the barrier in vehicles of various sizes and configurations.

5. A barrier according to claim 2, wherein each of the plurality of fasteners comprise a chord loop.

6. A barrier according to claim 2, wherein each of the plurality of cooperating fasteners connectable to the interior of a vehicle comprise a hook.

7. A barrier according to claim 2, wherein the plurality of fasteners comprise a reclosable, flexible, hook and loop fastener material bonded to the face thereof.

8. A barrier according to claim 2, wherein the plurality of cooperating fasteners comprise a reclosable, flexible, hook and loop fastener material bonded to the face thereof.

* * * * *